(12) United States Patent
Wujciga

(10) Patent No.: US 6,594,926 B1
(45) Date of Patent: Jul. 22, 2003

(54) VEHICLE LICENSE PLATE COVER

(76) Inventor: Edward J. Wujciga, 1543 Alan Rd., Naperville, IL (US) 60564

( * ) Notice: Subject to any disclaimer, the term of this patent is extended or adjusted under 35 U.S.C. 154(b) by 0 days.

(21) Appl. No.: 09/248,553

(22) Filed: Feb. 11, 1999

(51) Int. Cl.$^7$ ............................................... G09F 7/00
(52) U.S. Cl. ...................................................... 40/200
(58) Field of Search ........................... 40/200, 201, 202, 40/209

(56) References Cited

U.S. PATENT DOCUMENTS

| | | | | |
|---|---|---|---|---|
| 1,664,302 A | * | 3/1928 | Leopold et al. ............ | 40/209 X |
| 4,891,895 A | * | 1/1990 | DeLaquil, Jr. ............. | 40/201 X |
| 5,012,602 A | * | 5/1991 | Storey ........................... | 40/201 |
| 5,381,618 A | * | 1/1995 | Singleton ...................... | 40/202 |
| 5,623,776 A | | 4/1997 | Lucier .......................... | 40/209 |
| 5,783,265 A | * | 7/1998 | Parkander .................. | 40/209 X |

FOREIGN PATENT DOCUMENTS

| | | | | |
|---|---|---|---|---|
| FR | 2543499 | * | 10/1984 | ................. 40/200 |
| GB | 2222904 | * | 3/1990 | ................. 40/200 |

* cited by examiner

*Primary Examiner*—Brian K. Green
(74) *Attorney, Agent, or Firm*—Bissell & Bissell; Henry M. Bissell; Henry M. Bissell, IV

(57) ABSTRACT

A decorative and durable vehicle license plate cover is a flat, rigid, relatively thick, mar-resistant plate of optically transparent stable plastic, such as acrylic plastic. The plate has a solid body, with a front surface, a rear surface and sides interconnecting the front and rear surfaces. At least one and preferably all of the sides slope at about 30–60 degrees forwardly from the larger area rear surface to the smaller area front surface. The sloped sides are smooth and light reflective to enhance the appearance of the cover. Spaced holes are drilled or otherwise formed in the perimeter of the front surface and extend to the rear surface for attaching the cover to a vehicle license plate. The plate includes at least one of laser etching or engraving and printed indicia. The laser etching is disposed on the front and/or rear surface and/or interior of the plate.

5 Claims, 3 Drawing Sheets

VEHICLE LICENSE PLATE COVER

BACKGROUND OF THE INVENTION

1. Field of the Invention

The present invention generally relates to license plate covers and more particularly to an improved decorative, durable, light reflective vehicle license plate cover.

2. Prior Art

Many different types of license plate covers have been devised, most of which merely comprise metal or plastic frames holding the outer periphery of a license plate and with the face of the license plate wholly exposed. Such frames can include printed and/or embossed advertising indicia and the like. Those frames do not protect the license plate from mud, grime and the like and add little, if anything, to the appearance of the license plate.

Some newer types of license plate covers have been made which extend across the front face of the license plate and through which the license plate can be viewed. One such cover is set forth in U.S. Pat. No. 5,623,776. The cover of that patent is thin, flexible, transparent plastic in the form of a plate having a rearwardly extending rib or flange which centers the license plate within a rear recess. In addition, the cover includes positioning tabs extending from the main body of the cover plate. The cover does little to enhance the appearance of the license plate and is difficult to make and fix in place.

Certain license plate covers are illuminated internally or externally to improve their appearance and the ease of viewing of the license plate. See, for example, U.S. Pat. Nos. 2,875,539, 5,615,501 and 5,666,749. However, these covers are expensive, not very durable and may require periodic replacement of their illuminating means.

There remains a need for a simple, inexpensive, durable vehicle plate cover which will protect the face of a vehicle license plate and will afford easy viewing of the license number while providing an enhanced decorative effect. Moreover, the cover should provide means for easily installing decorative advertising indicia and the like during or after manufacture of the cover. The cover should be quick and easy to install and to remove.

SUMMARY OF THE INVENTION

The improved vehicle license plate cover of the present invention satisfies all the foregoing needs. The cover is inexpensive, very durable, mar-resistant and highly decorative in appearance. It can provide a unique three-dimensional effect for indicia located on or in the cover. Moreover, the cover is highly light reflective and novel in overall appearance. It is of unitary construction and easy to install and remove, permitting full viewing of a license plate located behind the cover, while protecting the license plate from damage. Moreover, the method of the present invention provides the cover with desired laser etched indicia of any suitable size, shape and design.

The license plate cover of the present invention is a generally flat, preferably rectangular, thick plate or body of durable, mar-resistant optically transparent stable plastic, such as acrylic plastic or the like having a front surface, an opposite rear surface and sides interconnecting the front and rear surfaces. The plate can be, for example, up to about 0.5 inch in thickness, or even thicker, if desired.

At least one and preferably all the sides of the plate slope inwardly and forwardly at an angle of about 30–60 degrees, preferably at about 45 degrees, from the larger rear surface to the smaller front surfasce of the plate. The sloping sides are smooth and highly light reflective for an enhanced appearance. Spaced holes are drilled or otherwise formed in the periphery of the front surface and extend rearwardly to the rear surface of the plate for attaching the plate directly over the face of a vehicle license plate.

The plate also contains at least one of laser etching and/or printed indicia viewable from the plate. The laser etching can be on the front surface, rear surface or in the interior of the plate. The printed indicia is disposed on the front and/or rear surface of the plate.

The laser etching, in accordance with the present method, can be carried out by scanning an image in a scanner, passing the scanner signals through a computer and passing the computer signals to an etching machine wherein the etching is carried out. Alternatively, the etching can be done by a hand held laser stylus or other device. The etching provides the plate with a unique three-dimensional effect, as hereinafter more fully described.

Further features of the cover plate of the present invention and the method of making the same are set forth in the following detailed description and accompanying drawings.

DRAWINGS OF THE EMBODIMENTS

Figure 5:
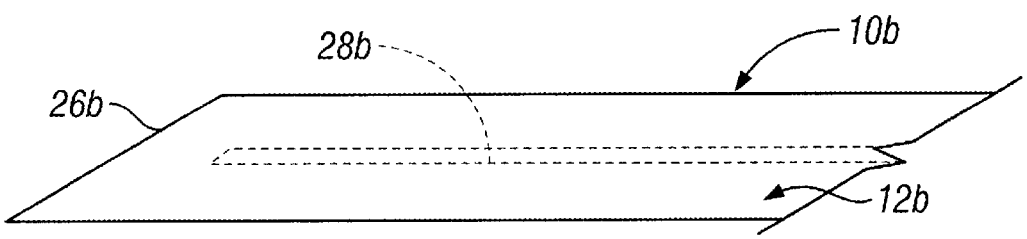
Figure 4:
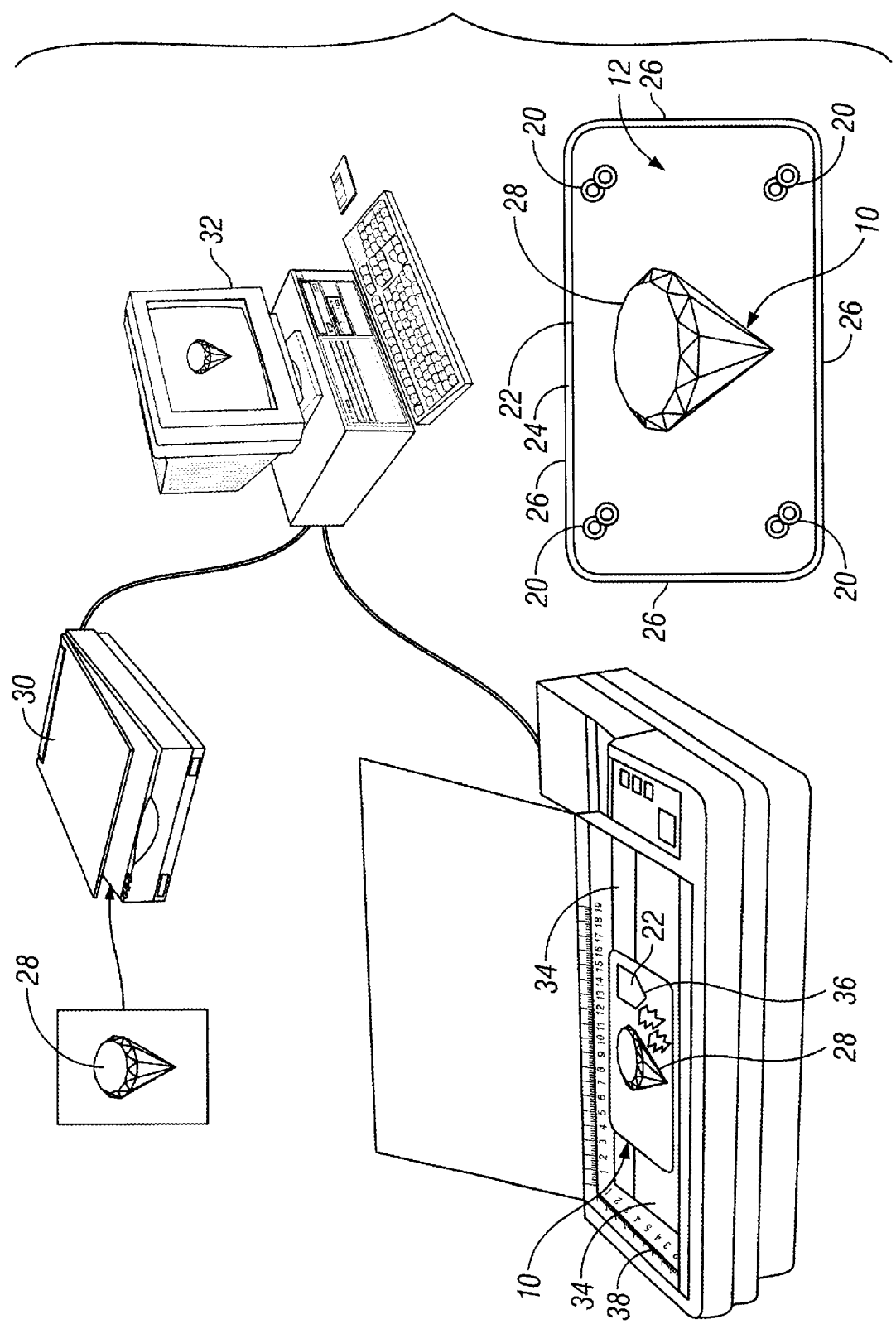

FIG. 4 is a schematic depiction of equipment utilized in a method, in accordance with the present invention, for etching the image of the cover of FIG. 1, utilizing a scanner, computer and etching machine; and, FIG. 5 is an enlarged, fragmentary side elevation of a third preferred embodiment of the improved cover plate of the present invention, showing a laser etched image disposed below the surface of the cover plate.

DETAILED DESCRIPTION OF THE EMBODIMENTS

Figure 1:
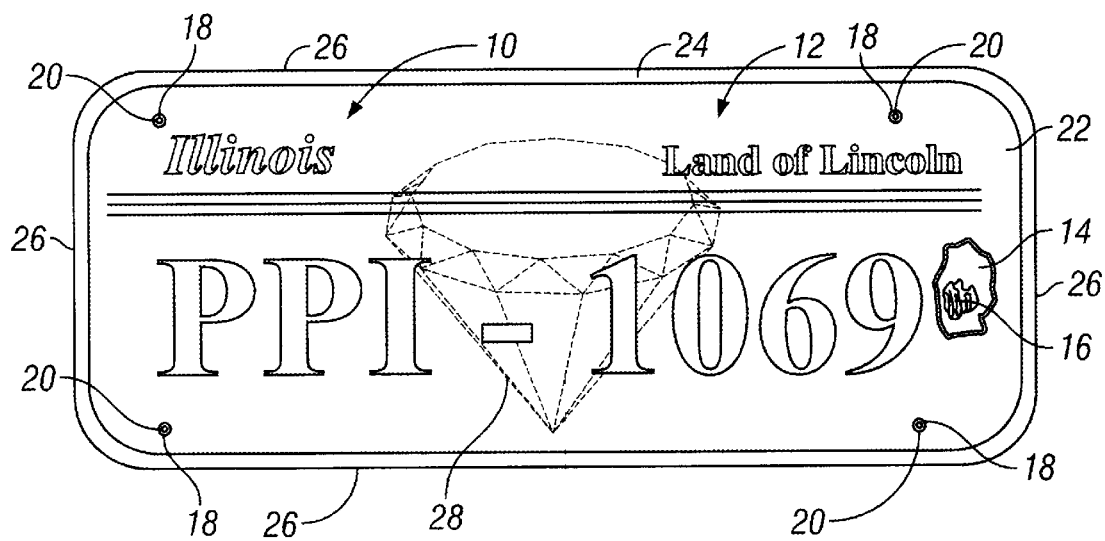
FIG. 1 is a schematic front perspective view, partly broken away, of a first preferred embodiment of the improved vehicle license plate cover of the present invention, shown in place over a vehicle license plate.

FIGS. 1 and 4

Now referring more particularly to FIGS. 1 and 4 of the drawings, a first preferred embodiment of the improved vehicle license plate cover of the present invention is schematically depicted therein. Thus, cover 10 is shown which comprises a thick, solid, flat plate 12 of mar-resistant, rigid, durable, optically transparent, visually stable plastic, such as acrylic plastic or other polycarbonate plastic having the requisite properties.

Plate 12 is of sufficient dimensions to cover the entire face 14 of a vehicle license plate 16, as shown in FIG. 1. Plate 12 is releasably secured to license plate 16, as by screws or bolts 18 passing through openings 20 extending rearwardly through plate 12 from the front surface 22 thereof to the rear surface 24 thereof and through license plate 16 and into a support bracket (not shown). Openings 20 can be molded into plate 12 or can be drilled out after plate 12 is formed.

Openings 20 are preferably spaced along the outer periphery of front surface 22 of plate 12 so as to align with openings (not shown) in license plate 16.

Rear surface 24 of plate 12 is of larger area than the area of front surface 22, due to the presence of sides 26 which can slope inwardly at an angle of about 30–60 degrees from the outer periphery of rear surface 24 to the outer periphery of front surface 22. In FIGS. 1 and 4, sides 26 are shown to slope at an angle of about 35 degrees from the perpendicular.

Sides 26 are smooth and highly reflective, being integral with the remainder of plate 12. Sides 26 can be molded into their final shape, with or without final grinding and polishing, or can be ground and polished into their final shape after the remainder of plate 12 is formed and cut to size, or the like. Sides 26 are of substantial thickness and add a distinctive decorative appearance to cover 10, due to their reflectivity. For example, sides 26 can be up to 0.5 inch or more in thickness to assure the necessary rigidity to plate 12, to increase its reflectivity and to provide a novel three dimensional image, as more particularly described below, when an image is incorporated into cover 10.

Cover 10 is also characterized by a decorative image or design 28 engraved or laser etched into front surface 22 or rear surface 24. It will be understood that design 28 could be engraved or etched into both surfaces 22 and 24, if desired, to impart a three dimensional decorative effect to cover 10, when cover 10 is viewed at an oblique angle through front surface 22. Moreover, plate 12 also has a three-dimensional effect from design 28 when plate 12 is viewed through a side 26.

Laser etching can be achieved manually, that is, using a hand-held laser etching device (not shown), but it is preferred in accordance with the method of the present invention, to accomplish the etching of design 28 on plate 12 by means of a computer-assisted process.

In accordance with the present claimed method, which is a preferred method of making cover 10, plate 12 is first formed into the desired shape and size, as by molding, with or without subsequent cutting, grinding, polishing, etc., including sides 26, during or after which openings 20 are formed in plate 12 and thereafter suitable indicia, in this instance, design 28, are secured to or formed therein.

Thus, FIG. 4 shows schematically the equipment for one such indicia-affixing process. All such equipment is readily available and comprises a conventional scanner device 30 in which a depiction of diamond design 28 is placed and scanned. Scanner 30 is connected to a conventional computer 32 which receives scanning signals from scanner 30 and transmits digital output signals to a conventional laser etching machine 34 holding plate 12 for etching. Etching machine 34 controls the temperature and positioning of etching stylus 36, acting in response to the signals sent thereto by computer 32. Those signals control the size, shape and depth of etching of design 28 on plate 12.

The decorative design 28 in the form of a diamond is thus etched into the front surface 22 or rear surface 24 of plate 12 such that both design 28 and the number of license plate 16 are both clearly visible. Laser etching or engraving has the advantage of not obscuring a clear view of that license plate number, as required by law. Design 28 adds a distinctively different appearance to cover 10, in contrast to conventional license plate covers.

Accordingly, a strong, durable, optically clear vehicle license plate cover 10 having an improved decorative appearance, including a three-dimensional effect, is provided, preferably by the method specified above. Cover 10 fully protects vehicle license plate 16 against damage, while providing a highly reflective novel appearance to the assembled array of cover 10 and license plate 16.

Figure 2:
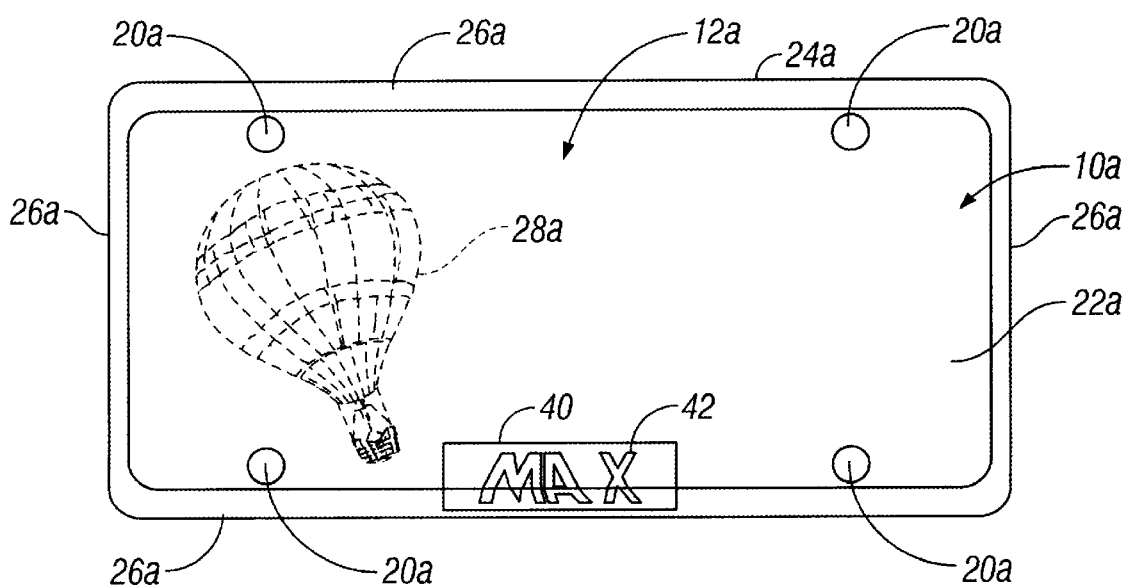
FIG. 2 is a schematic front elevation of a second preferred embodiment of the improved vehicle license plate cover of the present invention, with a laser etched image disposed on the front surface thereof and a printed decal strip affixed, as by adhesive, to the rear surface thereof for viewing through the front of the cover.
Figure 3:
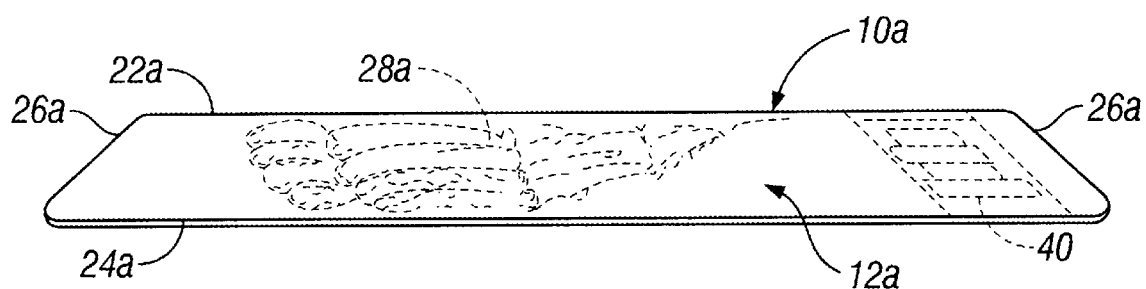
FIG. 3 is a schematic enlarged side elevation of the license plate cover of FIG. 2, showing the reflected laser etched image and a portion of the reflected printed image thereof.

FIGS. 2 and 3

Now referring more particularly to FIGS. 2 and 3 of the drawings, a second preferred embodiment of the improved vehicle license plate cover of the present invention is schematically depicted therein.

Thus, cover 10a is shown. Components thereof similar to those of cover 10 bear the same numerals, but are succeeded by the letter "a". Cover 10a differs from cover 10 only as follows:

a) Cover 10a has sides 26a at an angle of about 45 degrees from the perpendicular, thus providing a larger reflective surface than do sides 26 of cover 10.

b) Cover 10a bears two separate advertising and decorative indicia, namely, a decorative laser etching design 28a in the form of a balloon on front surface 22a of plate 12a, and a printed decal 40 glued to rear surface 24a of plate 12a and bearing printing 42 viewable through the front of plate 12a, as shown in FIGS. 2 and 3. Decal 40 is located near the lower margin of plate 12a out of the central area of plate 12a so as not to interfere with a clear view of a license plate number (not shown) when cover 12a is placed over a vehicle license plate (not shown).

It will be noted that printing 42 appears in a novel staggered design, due to the angle of sides 26a and that laser design 28a is viewable through sides 26a and appears to float within the body of plate 12a, also for a novel decorative appearance. Accordingly, cover 10a has the advantages of cover 10, plus an added decorative appearance.

FIG. 5

A third preferred embodiment of the improved vehicle license plate cover of the present invention is schematically depicted in FIG. 5. Thus, cover 10b is shown. Components thereof similar to those of cover 10 or 10a bear the same numerals, but are succeeded by the letter "b".

Cover 10b differs from cover 10 only as follows:

a) Sides 26b slope at about 60 degrees from the perpendicular.

b) Laser etched design 28b is schematically illustrated in FIG. as being located at about half way between front surface 22b and rear surface 24b, thus placing design 28b in a protected area in plate 12b, so as not to be subject to filling with dirt and so as not to be subject to abrasion during use of cover 10b. Design 28b appears to float within plate when viewed at various angles. Cover 10b is otherwise identical to cover 10 in construction and advantages.

Various other modifications, changes, alterations and additions can be made in the improved vehicle license plate cover of the present invention, its components and parameters, and in the present method and its steps. All such modifications, changes, alterations and additions as are within the scope of the appended claims form part of the present invention.

What is claimed is:

1. An improved durable and decorative vehicle license plate cover, said cover consisting of a single, flat, rigid, solid mar-resistant plate of optically transparent plastic having a thickness of about 0.5 inch, said plate having a front surface, an opposite rear surface and sides interconnecting said front and rear surfaces, said sides sloping forwardly and inwardly at an angle of about 30–60 degrees from said rear surface to said front surface, whereby said rear surface has a greater surface area than said front surface, said sloping sides being smooth and light reflective to enhance the decorative appearance of said cover.

2. The improved vehicle license plate cover of claim 1 wherein said plate is generally rectangular with four of said sloping sides.

3. The improved vehicle license plate cover of claim 2 wherein said plate cover includes holes for attaching said plate cover to a vehicle license plate and wherein said plate cover bears indicia viewable from the sides of said plate cover, said indicia being on at least one of said front surface, rear surface and interior of said plate cover.

4. The improved vehicle license plate cover of claim 3 wherein said indicia is a laser engraving and wherein said slope is about 45 degrees from said rear surface to said front surface.

5. The improved vehicle license plate cover of claim 4 wherein said laser engraving is disposed in the interior of said cover and wherein said plate cover comprises acrylic plastic.

\* \* \* \* \*